(12) United States Patent
Hsu

(10) Patent No.: US 12,086,339 B2
(45) Date of Patent: Sep. 10, 2024

(54) DRIVING CIRCUIT FOR PROVIDING CONTROL SIGNALS TO TOUCH DISPLAY PANEL

(71) Applicant: NOVATEK Microelectronics Corp., Hsinchu (TW)

(72) Inventor: Chia-Lun Hsu, Hsinchu (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 18/067,719

(22) Filed: Dec. 18, 2022

(65) Prior Publication Data
US 2024/0012500 A1 Jan. 11, 2024

Related U.S. Application Data

(60) Provisional application No. 63/368,063, filed on Jul. 10, 2022.

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01)

(58) Field of Classification Search
CPC .............................. G06F 3/0412; G06F 3/044
See application file for complete search history.

(56) References Cited

U.S. PATENT DOCUMENTS 10,564,771 B2  2/2020 Choi
2017/0192608 A1* 7/2017 Jang .................... G06F 3/04166

FOREIGN PATENT DOCUMENTS

| CN | 105353919 A | 2/2016 |
| CN | 114327113 A | 4/2022 |
| TW | 202109502 A | 3/2021 |
| TW | 202119387 A | 5/2021 |

* cited by examiner

*Primary Examiner* — Yaron Cohen
(74) *Attorney, Agent, or Firm* — CKC & Partners Co., LLC

(57) ABSTRACT

A driving circuit, for driving a touch display panel, includes a controller, a first diode, a first capacitor, a second diode and a second capacitor. The controller is configured to provide a first modulation signal and a second modulation signal. The first diode is coupled between a power integrated circuit and a first node for providing a low gate output signal to the touch display panel. The first capacitor is coupled between the controller and the first node. The second diode is coupled between the power integrated circuit and a second node for providing a high gate output signal to the touch display panel. The second capacitor is coupled between the controller and the second node. During a touch period, the controller is configured to provide the first modulation signal with toggling voltage levels, and provide the second modulation signal with toggling voltage levels.

20 Claims, 8 Drawing Sheets

US 12,086,339 B2

DRIVING CIRCUIT FOR PROVIDING CONTROL SIGNALS TO TOUCH DISPLAY PANEL

RELATED APPLICATIONS

This application claims the priority benefit of U.S. Provisional Application Ser. No. 63/368,063, filed Jul. 10, 2022, which is herein incorporated by reference.

BACKGROUND

Field of Invention

The disclosure relates to a driving circuit for a touch display panel. More particularly, the disclosure relates to a driving circuit with a load-free driving function for providing control signals to a touch display panel.

Description of Related Art

An in-cell touch display panel is usually driven by some control signals (e.g., data signals, scan signals, touch-sensing pulse signals or common voltage signals) generated by a driver circuit. These control signals are utilized to perform a display function and/or a touch sensing function on the in-cell touch display panel. While performing the display function, the control signals generated by the driver circuit are usually configured at fixed voltage levels. While performing the touch-sensing function, the control signals can be adjusted into varying voltage levels.

SUMMARY

The disclosure provides a driving circuit, which can be utilized to drive a touch display panel. The driving circuit includes a controller, a first diode, a first capacitor, a second diode and a second capacitor. The controller is configured to provide a first modulation signal and a second modulation signal. A cathode of the first diode is coupled to a power integrated circuit. An anode of the first diode is coupled to a first node for providing a low gate output signal to the touch display panel. The first capacitor is coupled between the controller and the first node. An anode of the second diode is coupled to the power integrated circuit. A cathode of the second diode is coupled to a second node for providing a high gate output signal to the touch display panel. The second capacitor is coupled between the controller and the second node.

The disclosure provides a driving circuit, which can be utilized to drive a touch display panel. The driving circuit includes a controller, a first transistor, a first capacitor, a second transistor and a second capacitor. The controller is configured to provide a first modulation signal, a second modulation signal, a first control signal and a second control signal. The first transistor is coupled between a power integrated circuit and a first node. The first node is configured for providing a low gate output signal to the touch display panel. A control terminal of the first transistor is controlled by the first control signal. The first capacitor is coupled between the controller and the first node. The second transistor is coupled between a power integrated circuit and a second node. The second node is configured for providing a high gate output signal to the touch display panel. The second capacitor is coupled between the controller and the second node.

It is to be understood that both the foregoing general description and the following detailed description are demonstrated by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
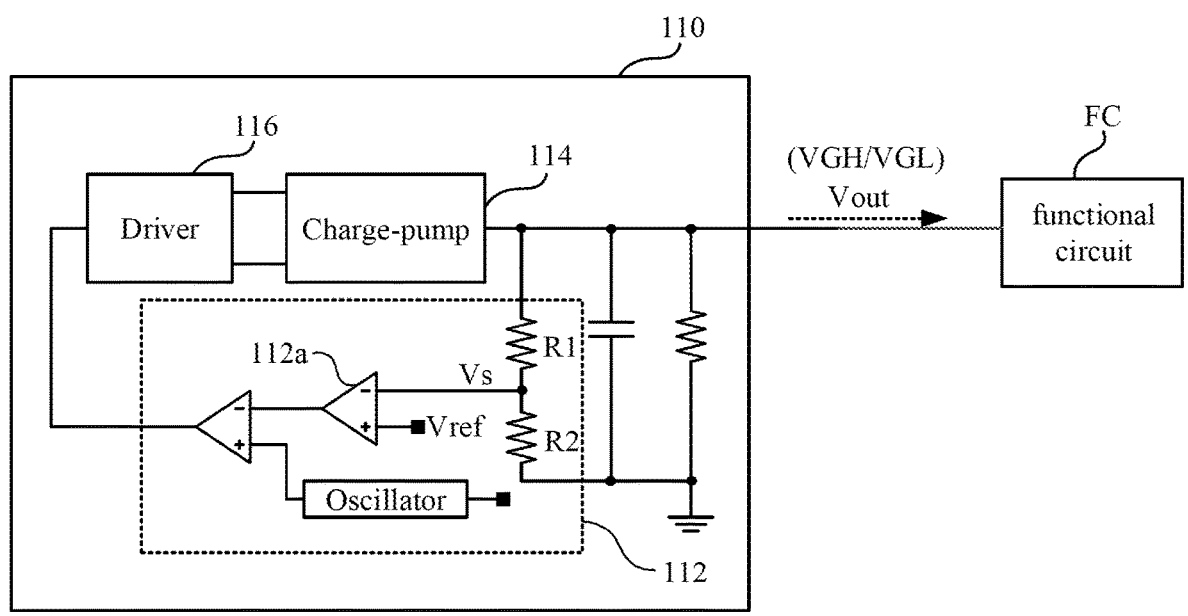
FIG. 1 is a schematic diagram illustrating a voltage regulator in a power integrated circuit in some applications.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a schematic diagram illustrating a voltage regulator 110 in a power integrated circuit (power IC). The voltage regulator 110 is configured to generate an output voltage signal Vout.

In some cases, the voltage regulator 110 can generate the output voltage signal Vout with a high voltage level, and this voltage signal Vout can be utilized as a high gate voltage VGH.

In some other cases, the voltage regulator 110 can generate the output voltage signal Vout with a low voltage level, and this voltage signal Vout can be utilized as a low gate voltage VGL.

The high gate voltage VGH or the low gate voltage VGL can be transmitted to a functional circuit FC in a touch display panel (not shown in FIG. 1). For example, the functional circuit FC can be a gate driver, a source driver, a timing controller or other similar functional component of the touch display panel. In reference with the high gate voltage VGH or the low gate voltage VGL, the functional circuit FC is configured to generate some control signals (e.g., DATA, SCAN, Vcom or GND) to drive the touch display panel.

During a display period, the voltage regulator 110 is configured to generate the output voltage signal Vout, which is utilized as a control signal (e.g., a data signal, a scan signal, a touch-sensing signal or a common voltage signal)

for driving the touch display panel. In ideal cases, the output voltage signal Vout is required to be constant at a target voltage level.

As shown in FIG. 1, the voltage regulator 110 includes a feedback component 112. The feedback component 112 is able to detect the output voltage signal Vout, sample the output voltage signal Vout, compare the sampled output voltage signal Vs with a reference voltage Vref by a comparator 112*a*, and feedback controls the charge pump 114. As shown in FIG. 1, the output voltage signal Vout is sampled by a voltage divider formed by two resistors R1 and R2 into the sampled output voltage signal Vs. For example, when theses two resistors R1 and R2 has the same resistance, the sampled output voltage signal Vs will be a half of the output voltage signal Vout. It is assumed that the output voltage signal Vout is desired to be constant at the target voltage level (e.g., 5V). When the sampled output voltage signal Vs is detected to be over 2.5V (which indicates that the output voltage signal Vout is over the target voltage level 5V), the feedback component 112 is able to detect that the output voltage signal Vout exceeds the target voltage level (according to a comparison output of the comparator 112*a*), and feedback a detection result to the driver 116. In this case, the driver 116 is triggered to pull low the output voltage signal Vout generated by the charge pump 114.

On the other hand, when the sampled output voltage signal Vs is detected to be below 2.5V (which indicates that the output voltage signal Vout is below the target voltage level 5V), the feedback component 112 is able to detect the situation and feedback a detection result to the driver 116. In this case, the driver 116 is triggered to pull up the output voltage signal Vout. In this case, the feedback component 112 is able to ensure that the output voltage signal Vout is constant and stable on the target voltage level.

During a touch period, it is desired that the control signals utilized in the touch display panel can swing above and below the original DC voltage levels to achieve a load-free driving (LFD) function. In-cell touch display panels are usually driven by driver circuits with the load-free driving function to overcome large parasitic capacitances of the in-cell touch sensors. In this case, it is desired that the high gate voltage VGH or the low gate voltage VGL generated by the voltage regulator 110 can swing up and down relative to an original level to achieve the load-free driving function during the touch period. However, a toggling voltage level on the high gate voltage VGH or the low gate voltage VGL is against the function of the feedback component 112 (keeping the output voltage signal Vout stable on the predetermined level).

Figure 2:
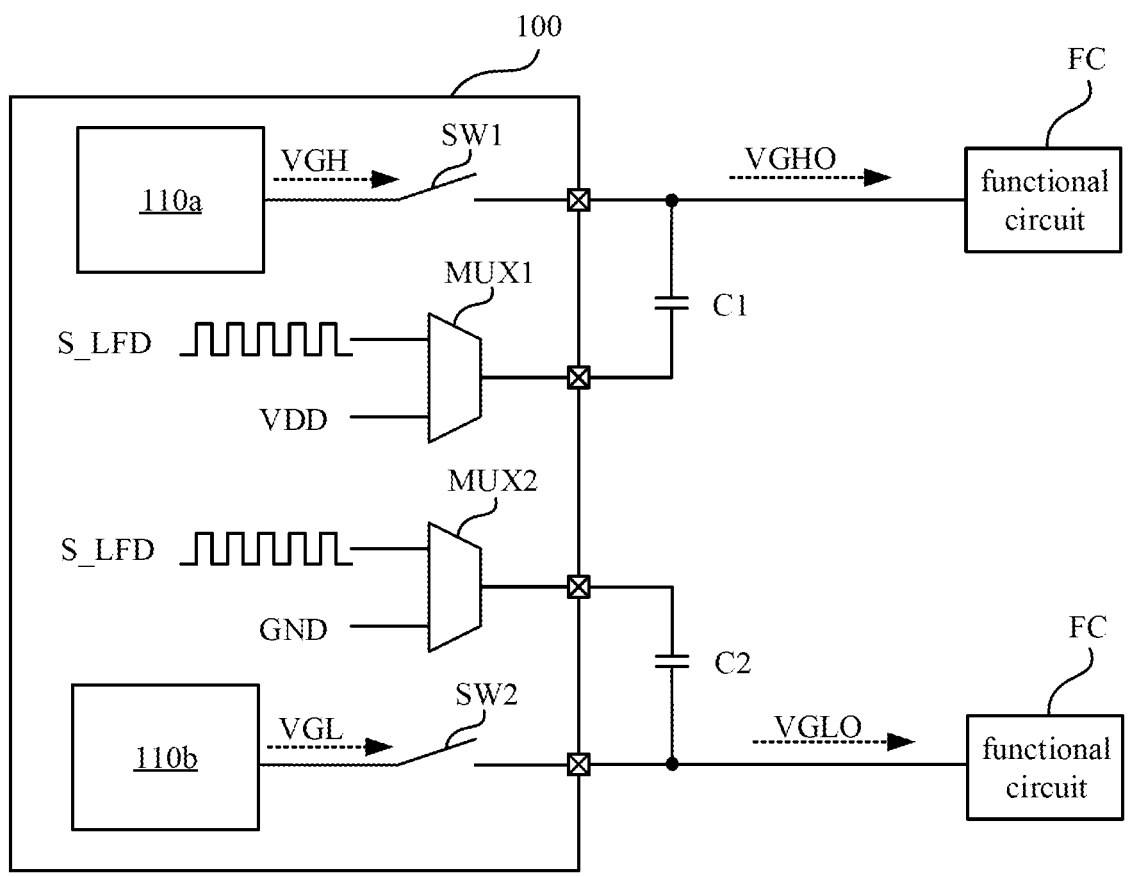
FIG. 2 is a schematic diagram illustrating a power integrated circuit according to an embodiment of the disclosure.

Reference is made to FIG. 2. FIG. 2 is a schematic diagram illustrating a power integrated circuit 100 with a modified structure to achieve the load-free driving (LFD) function according to an embodiment of the disclosure. As shown in FIG. 2, the power integrated circuit 100 includes a first voltage regulator 110*a* (for generating the high gate voltage VGH), a second voltage regulator 110*b* (for generating the low gate voltage VGL), two switches SW1 and SW2 and multiplexers MUX1 and MUX2. Internal structures in each of the first voltage regulator 110*a* and the second voltage regulator 110*b* in FIG. 2 are similar to the voltage regulator 110 as shown in FIG. 1.

Figure 3:
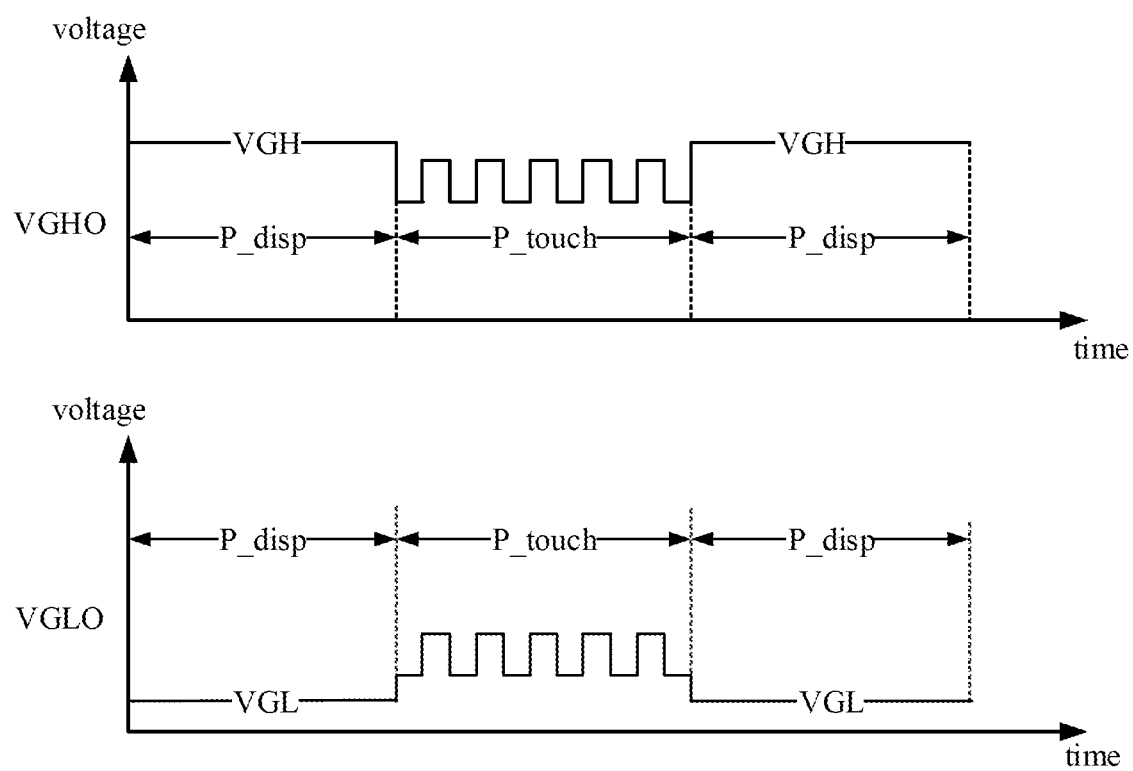
FIG. 3 is a signal waveform illustrating voltage levels of a high gate output signal and a low gate output signal over time.

Reference is further made to FIG. 3, which is a signal waveform illustrating voltage levels of a high gate output signal VGHO and a low gate output signal VGLO generated by the first voltage regulator 110*a* and the second voltage regulator 110*b* in FIG. 2.

As shown in FIG. 2 and FIG. 3, during the display period P_disp, the switch SW1 is turned on to output the high gate voltage VGH generated by the first voltage regulator 110*a* to the functional circuit FC as the high gate output signal VGHO, and the multiplexer MUX1 outputs a high system voltage AVDD to a capacitor C1. During the display period P_disp, the switch SW2 is turned on to output the low gate voltage VGL generated by the second voltage regulator 110*b* to the functional circuit FC as the low gate output signal VGLO, and the multiplexer MUX2 outputs a ground voltage GND to another capacitor C2. In this case, during the display period P_disp, the high gate output signal VGHO is fixed at a high level, and the low gate output signal VGLO is fixed at a low level.

As shown in FIG. 2 and FIG. 3, during the touch period P_touch, the switch SW1 is turned off to block the high gate voltage VGH, and the multiplexer MUX1 outputs a swing signal S_LFD to the capacitor C1. The swing signal S_LFD is coupled through the capacitor C1 to adjust a voltage level on the high gate output signal VGHO. In this case, the high gate output signal VGHO toggles up and down in reference with the swing signal S_LFD.

In addition, during the touch period P_touch, the switch SW2 is turned off to block the low gate voltage VGL, and the multiplexer MUX2 outputs the swing signal S_LFD to the capacitor C1. The swing signal S_LFD is coupled through the capacitor C2 to adjust a voltage level on the low gate output signal VGLO. In this case, the low gate output signal VGLO toggles up and down in reference with the swing signal S_LFD.

In the embodiments shown in FIG. 2 and FIG. 3, during the display period P_disp, the power integrated circuit 100 is able to generate the high gate output signal VGHO and the low gate output signal VGLO at fixed levels. During the touch period P_touch, the power integrated circuit 100 is able to generate the high gate output signal VGHO and the low gate output signal VGLO toggling up and down in reference with the swing signal S_LFD.

It is noticed that the power integrated circuit 100 as shown in FIG. 2 with the modified structure is required to include switches SW1 and SW2, multiplexers MUX1 and MUX2 and a signal generator (not shown in FIG. 2) for generating the swing signal S_LFD, to achieve the load-free driving (LFD) function during the touch period P_touch and maintain the original function during the display period P_disp. In some cases, a common power integrated circuit purchased from a third-party manufacturer may not include aforesaid modified internal structures (as the power integrated circuit 100 shown in FIG. 2) for supporting the load-free driving function during the touch period P_touch. In other words, the common power integrated circuit purchased from the third-party manufacturer is usually able to provide the high gate voltage VGH and the low gate voltage VGL at constant voltage levels without a capability to provide toggling signals for the LFD function.

Figure 4:
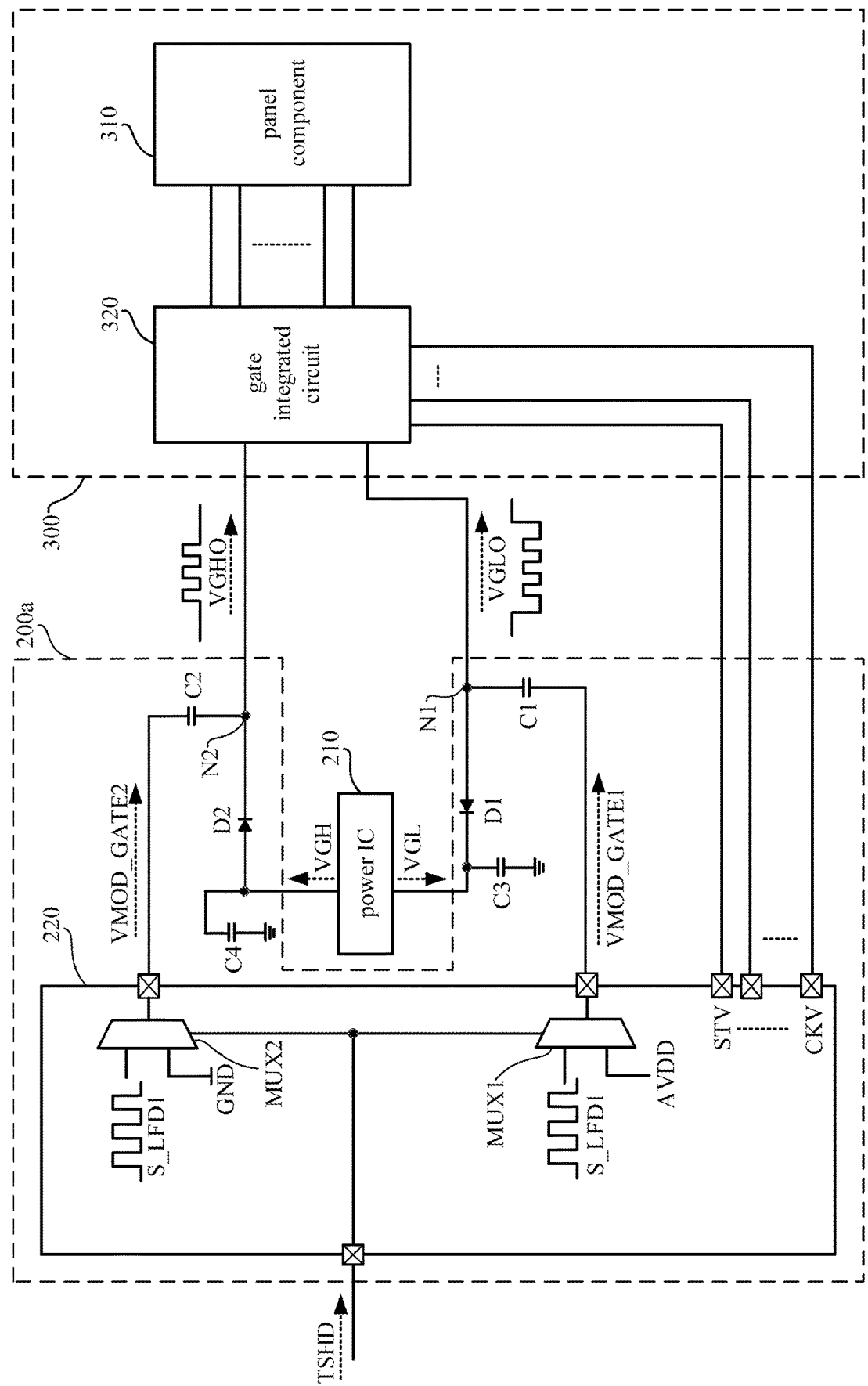
FIG. 4 is a schematic diagram illustrating a driving circuit for driving a touch display panel according to some embodiments of the disclosure.

Reference is further made to FIG. 4, which is a schematic diagram illustrating a driving circuit 200*a* for driving a touch display panel 300 according to some embodiments of the disclosure. In some embodiments, the touch display panel 300 can be an in-cell touch display panel which includes a panel component 310 and a gate integrated circuit (gate IC) 320. The panel component 310 may include signal wirings (e.g., gate lines, word lines, data lines or clock lines) and pixels connected with the signal wirings of the touch display panel 300. The gate integrated circuit 320 is configured to generate some control signals (e.g., gate driving signals) to the panel component 310. The driving circuit

200a is able to provide the low gate output signal VGLO at a first node N1 and the high gate output signal VGHO at a second node N2. The high gate output signal VGHO and the low gate output signal VGLO are transmitted to the gate integrated circuit 320 of the touch display panel 300. The gate integrated circuit 320 is also known as a gate driver of the touch display panel 300. In some embodiments, the driving circuit 200a is configured to provide the high gate output signal VGHO and the low gate output signal VGLO at fixed levels during the display period P_disp, and provide the high gate output signal VGHO and the low gate output signal VGLO toggling up and down in reference with a swing signal S_LFD1 during the touch period P_touch, without adjusting an internal structure in a power integrated circuit 210. It is noticed that the driving circuit 200a shown in FIG. 4 is suitable for the swing signal S_LFD1 toggling between a low voltage level (e.g., 0V) and a positive voltage level (>0V).

As shown in FIG. 4, the driving circuit 200a includes two diodes D1~D2, four capacitor C1~C4, a power integrated circuit 210 and a controller 220. The controller 220 includes two multiplexers MUX1 and MUX2.

As shown in FIG. 4, the power integrated circuit 210 is configured to provide a high gate voltage VGH (at a fixed high level) and a low gate voltage VGL (at a fixed low level). The power integrated circuit 210 can be implemented by including two voltage regulators (referring to FIG. 1) for providing the high gate voltage VGH and the low gate voltage VGL respectively. In this case, the power integrated circuit 210 is not required to toggle the voltage levels of the high gate voltage VGH and the low gate voltage VGL. Therefore, the power integrated circuit 210 can be implemented by a common design and can be purchased from a third-party manufacturer. The toggling signals for the LFD function are provided by other components (two diodes D1~D2, four capacitor C1~C4 and the controller 220) in the driving circuit 200a.

Figure 5:
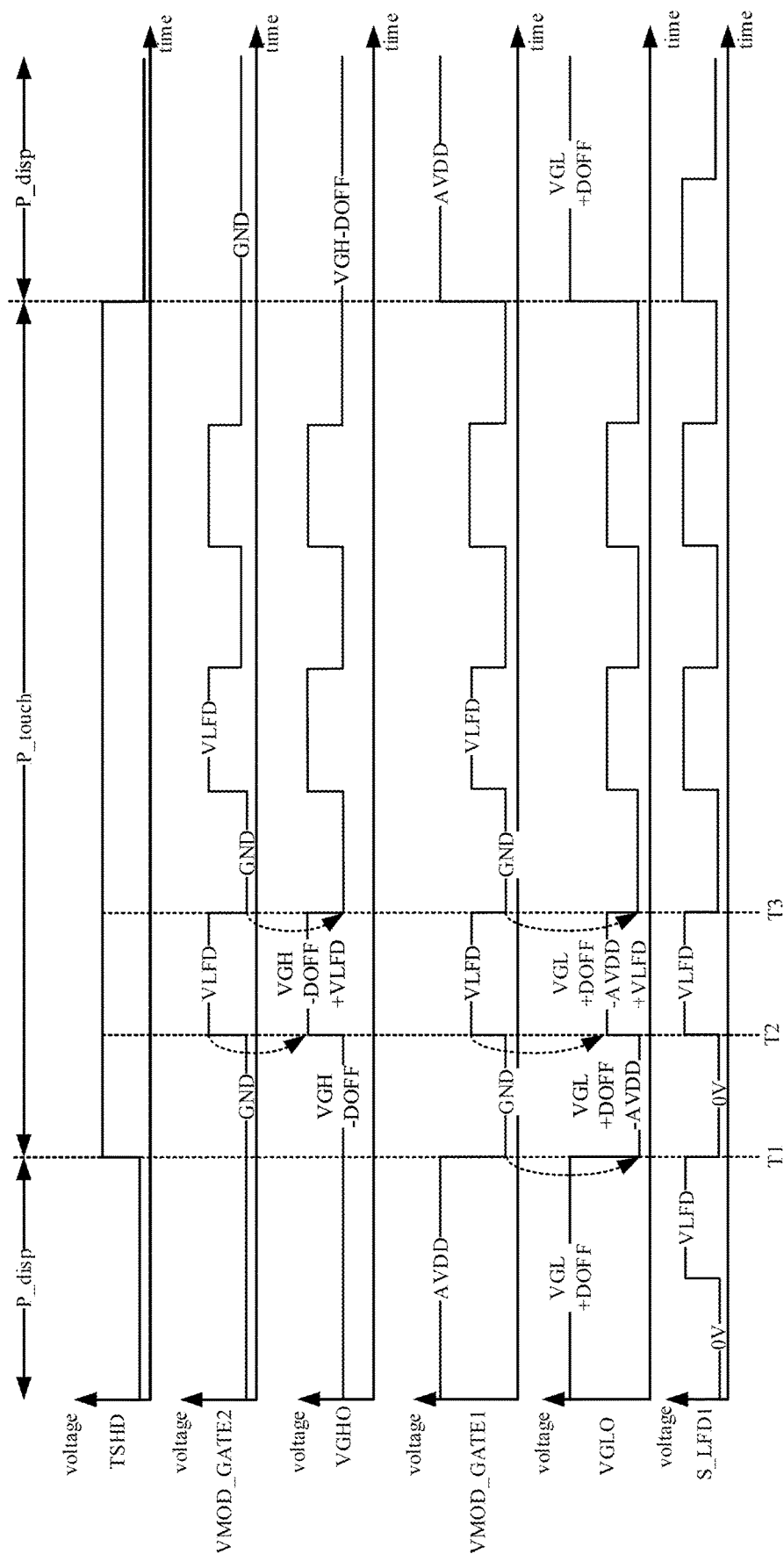
FIG. 5 is a signal waveform illustrating voltage levels of voltage signals over time related to the driving circuit shown in FIG. 4.

Reference is further made to FIG. 5, which is a signal waveform illustrating voltage levels of voltage signals over time related to the driving circuit 200a shown in FIG. 4.

As shown in FIG. 4, two inputs of the multiplexer MUX1 are respectively configured to receive a high system voltage AVDD and a swing signal S_LFD1 toggling between two voltage levels. Two inputs of the multiplexer MUX2 are respectively configured to receive a reference voltage (e.g., a ground voltage GND in this embodiment) and the swing signal S_LFD1.

As shown in FIG. 4 and FIG. 5, during the display period P_disp, a mode selection signal TSHD, for controlling the multiplexers MUX1 and MUX2, is configured at a low level, such that the multiplexer MUX1 selects the high system voltage AVDD as a first modulation signal VMOD_GATE1, and the multiplexer MUX2 selects the reference voltage (e.g., the ground voltage GND) as a second modulation signal VMOD_GATE2. In this case, during the display period P_disp, the first modulation signal VMOD_GATE1 is fixed at the high system voltage AVDD, and the second modulation signal VMOD_GATE2 is fixed at the reference voltage (e.g., the ground voltage GND).

As shown in FIG. 4, the capacitor C1 is coupled between the controller 220 and the first node N1. One end of the capacitor C1 receives the first modulation signal VMOD_GATE1 from the controller 220. The capacitor C2 is coupled between the controller 220 and the second node N2. One end of the capacitor C2 receives the second modulation signal VMOD_GATE2 from the controller 220.

As shown in FIG. 4, a cathode of the diode D1 is coupled to the power integrated circuit 210. During the display period P_disp, the low gate voltage VGL (at a fixed low level) generated by the power integrated circuit 210 is transmitted to the cathode of the diode D1. An anode of the diode D1 is coupled to the first node N1. Because of behaviors of the diode D1, when a voltage level on an anode of the diode D1 is larger than the low gate voltage VGL plus the diode offset DOFF, i.e., "VGL+DOFF", the diode D1 will conduct to discharge the voltage level on the anode of the diode D1. After discharging through the diode D1, the voltage on the first node N1 will eventually be equal to "VGL+DOFF". Therefore, the low gate output signal VGLO will be set to "VGL+DOFF", which is considered as a logic low level, because the diode offset DOFF is usually far smaller than a gap between VGH and VGL. In some practical applications, the diode offset DOFF can be 0.7V and the gap between VGH and VGL can be 5V, 7V or 10V. In some cases, the diode offset DOFF can be ignored in comparison with the gap between VGH and VGL.

As shown in FIG. 4, an anode of the diode D2 is coupled to the power integrated circuit 210. During the display period P_disp, the high gate voltage VGH (at a fixed high level) generated by the power integrated circuit 210 is transmitted to the anode of the diode D2. A cathode of the diode D2 is coupled to the second node N2. Because the high gate voltage VGH will be higher than a diode offset DOFF of the diode D2, the diode D2 will conducts to charge a voltage level on the cathode of the diode D2. Therefore, the high gate output signal VGHO will be set to the high gate voltage VGH minus the diode offset DOFF, i.e., "VGH−DOFF".

In other words, during the display period, the low gate output signal VGLO will be fixed at "VGL+DOFF", and the high gate output signal VGHO will be fixed at "VGH−DOFF".

As shown in FIG. 4 and FIG. 5, during a touch period P_touch, the mode selection signal TSHD, for controlling the multiplexers MUX1 and MUX2, is configured at a high level, such that the multiplexer MUX1 selects a swing signal S_LFD1 as a first modulation signal VMOD_GATE1, and the multiplexer MUX2 selects the swing signal S_LFD1 as a second modulation signal VMOD_GATE2. As shown in FIG. 5, the swing signal S_LFD1 toggles between a low voltage level and a positive function voltage level VLFD. In some embodiments, the low voltage level can be 0 volts, 0V, or a relatively low voltage level (e.g., 0.01V) approximately equal to 0V. The positive function voltage level VLFD is configured at a positive voltage level, such as 0.1V, 0.2V, 0.3V . . . or 0.5V. In other words, the swing signal S_LFD1 may toggle between 0V and 0.5V. In some embodiments, the positive function voltage level VLFD is configured to be smaller than the diode offset DOFF, so as to avoid a false trigger on the diodes D1 and D2.

Because the swing signal S_LFD1 toggles between the low voltage level (e.g., 0V) and the positive function voltage level VLFD, the first modulation signal VMOD_GATE1 and the second modulation signal VMOD_GATE2 also toggle between two voltage levels, the low voltage level (e.g., 0V) and the positive function voltage level VLFD.

When the driving circuit 200a is switched from the display period P_disp into the touch period P_touch (i.e., a time point T1 at a boundary between the display period P_disp and the touch period P_touch), the first modulation signal VMOD_GATE1 is changed from AVDD to 0V (because the swing signal S_LFD1 is currently at 0V). In this case, a voltage variance on the first modulation signal VMOD_GATE1 is "−AVDD". Due to a coupling effect of the capacitor C1, the low gate output signal VGLO is pulled low to "VGL+DOFF−AVDD" at the time point T1. It is noticed that, because the low gate output signal VGLO is pulled lower than a voltage level of the low gate voltage VGL, the diode D1 is not conducted (because the voltage on the anode of the diode D1 is lower than the voltage on the cathode of the diode D1), such that the low gate output signal VGLO is blocked by the diode D1 and will not be transmitted back to the power integrated circuit 210.

Afterward, at a time point T2 after the time point T1, the swing signal S_LFD1 toggles from 0V to the positive function voltage level VLFD, a voltage variance on the first modulation signal VMOD_GATE1 is "+VLFD". Due to the coupling effect of the capacitor C1, the low gate output signal VGLO is pulled up to "VGL+DOFF−AVDD+VLFD" at the time point T2.

Afterward, during the touch period P_touch, the low gate output signal VGLO toggles between "VGL+DOFF−AVDD" and "VGL+DOFF−AVDD+VLFD" along with the swing signal S_LFD1. In this case, the driving circuit 200a can provide the proper low gate output signal VGLO to achieve the load-free drive (LFD) function. It is noticed that, during the touch period P_touch, the voltage on the anode of the diode D1 is lower than the voltage on the cathode of the diode D1, such that the low gate output signal VGLO is blocked by the diode D1 and will not be transmitted back to the power integrated circuit 210. In this case, the low gate output signal VGLO with toggling waveform will not trigger a feedback stabilization function inside the power integrated circuit 210.

On the other hand, when it is switched from the display period P_disp into the touch period P_touch (i.e., a time point T1 at a boundary between the display period and the touch period), the second modulation signal VMOD_GATE2 remains unchanged at the low voltage level, e.g., 0V (because the swing signal S_LFD1 is currently at 0V at the time point T1). In this case, the high gate output signal VGHO remains at "VGH−DOFF" at the time point T1.

Afterward, at a time point T2 after the time point T1, the swing signal S_LFD1 toggles from the low voltage level (e.g., 0V) to the positive function voltage level VLFD, a voltage variance on the second modulation signal VMOD_GATE1 is "+VLFD". Due to the coupling effect of the capacitor C2, the high gate output signal VGHO is pulled up to "VGH−DOFF+VLFD" at the time point T2. It is noticed that, because the high gate output signal VGHO is pulled higher than a voltage level of the high gate voltage VGH, the diode D2 is not conducted (the voltage on the cathode of the diode D2 is higher than the voltage on the anode of the diode D2), such that the high gate output signal VGHO is blocked by the diode D2 and will not be transmitted back to the power integrated circuit 210. In this case, the high gate output signal VGHO with toggling waveform will not trigger a feedback stabilization function inside the power integrated circuit 210.

Afterward, during the touch period P_touch, the high gate output signal VGHO toggles between "VGH−DOFF" and "VGH−DOFF+VLFD" along with the swing signal S_LFD1. In this case, the driving circuit 200a can provide the proper high gate output signal VGHO to achieve the load-free drive (LFD) function.

In the embodiments shown in FIG. 4 and FIG. 5, the driving circuit 200a is able to provide the proper high gate output signal VGHO and the proper low gate output signal VGLO to the gate integrated circuit 320, without changing the internal structures of the power integrated circuit 210. In this case, the driving circuit 200a can cooperate with a typical design of the power integrated circuit 210 provided by any manufacturer. It is not required to put specific design into the power integrated circuit 210 to achieve the load-free drive (LFD) function.

It is noticed that the driving circuit 200a shown in FIG. 4 is suitable for the swing signal S_LFD1 toggling between the low voltage level (e.g., 0V) and a positive voltage level (i.e., the positive function voltage level VLFD higher than 0V). However, this disclosure is not limited to the swing signal S_LFD1 toggling between the low voltage level (e.g., 0V) and the positive voltage level.

Figure 6:
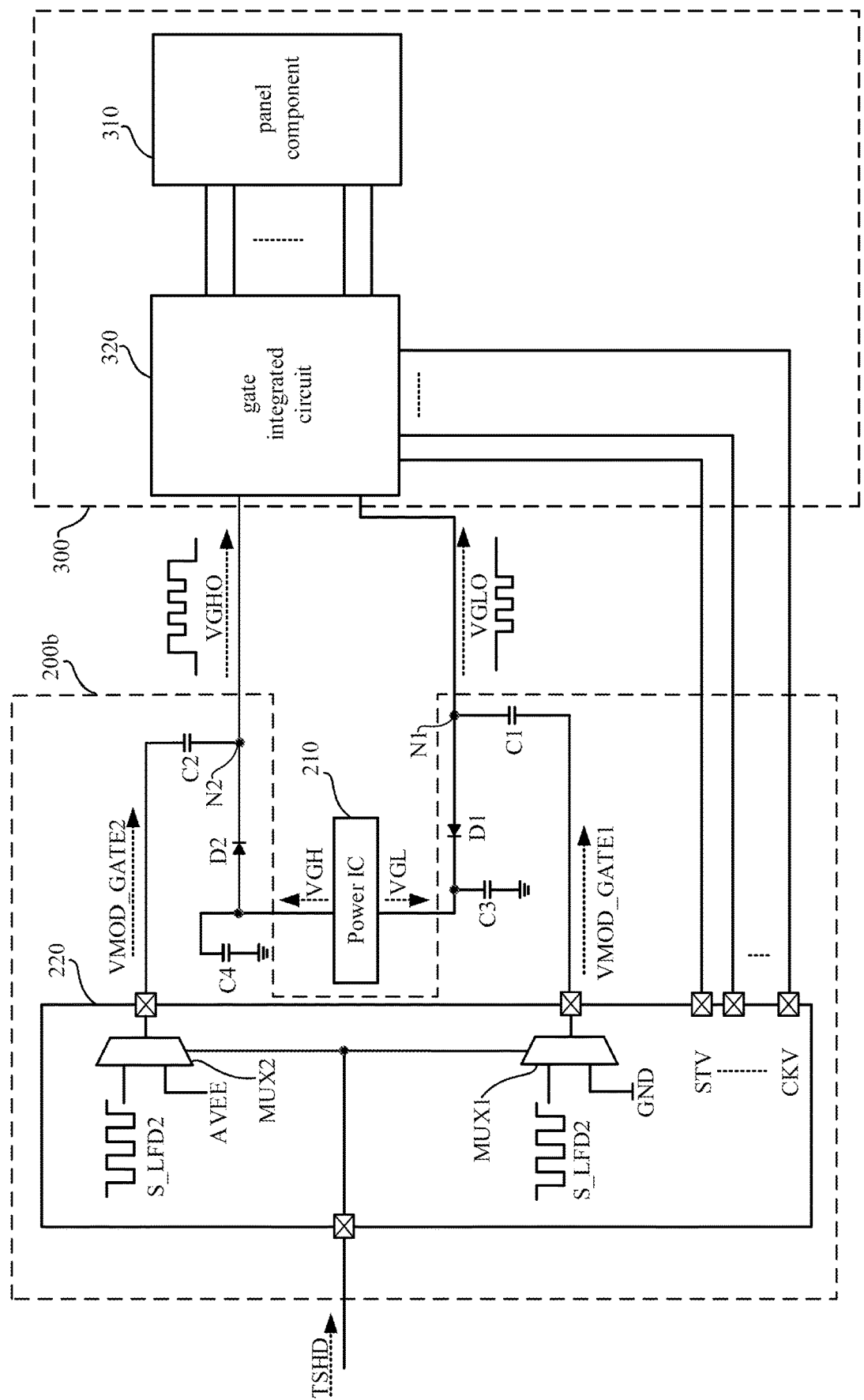
FIG. 6 is a schematic diagram illustrating a driving circuit for driving a touch display panel according to some embodiments of the disclosure.

Reference is further made to FIG. 6, which is a schematic diagram illustrating a driving circuit 200b for driving a touch display panel 300 according to some embodiments of the disclosure. Behaviors and functions of the driving circuit 200b in FIG. 6 are similar to the driving circuit 200a in FIG. 4. A main difference between the driving circuit 200b and the driving circuit 200a is that, the driving circuit 200b is suitable to provide the high gate output signal VGHO and the low gate output signal VGLO with a swing signal S_LFD2 toggling between the low voltage level (e.g., 0V) and a negative voltage level (lower than 0V).

The driving circuit 200b is able to provide the high gate output signal VGHO and the low gate output signal VGLO to the gate integrated circuit 320 of the touch display panel 300.

As shown in FIG. 6, the driving circuit 200b includes two diodes D1~D2, four capacitor C1~C4, a power integrated circuit 210 and a controller 220. The controller 220 includes two multiplexers MUX1 and MUX2.

As shown in FIG. 6, the power integrated circuit 210 is configured to provide a high gate voltage VGH (at a fixed high level) and a low gate voltage VGL (at a fixed low level). The power integrated circuit 210 can be implemented by including two voltage regulators (referring to FIG. 1) for providing the high gate voltage VGH and the low gate voltage VGL respectively.

Figure 7:
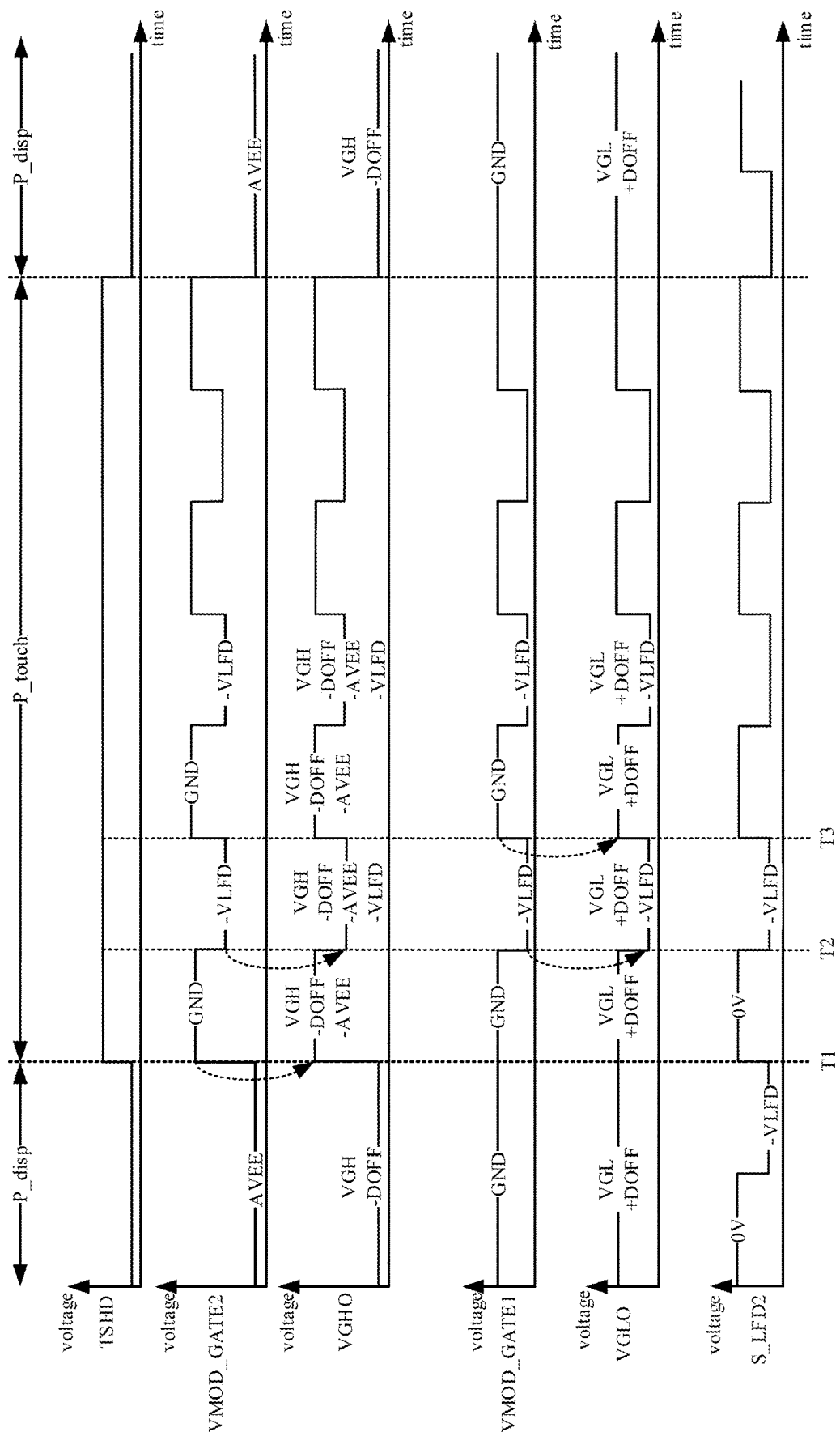
FIG. 7 is a signal waveform illustrating voltage levels of voltage signals over time related to the driving circuit shown in FIG. 6.

Reference is further made to FIG. 7, which is a signal waveform illustrating voltage levels of voltage signals over time related to the driving circuit 200b shown in FIG. 6.

As shown in FIG. 6 and FIG. 7, during the display period P_disp, a mode selection signal TSHD, for controlling the multiplexers MUX1 and MUX2, is configured at a low level, such that the multiplexer MUX1 selects a negative system voltage AVEE as a first modulation signal VMOD_GATE1 (fixed at the negative system voltage AVEE), and the multiplexer MUX2 selects a reference voltage (e.g., the ground voltage GND) as a second modulation signal VMOD_GATE2 (fixed at the ground voltage GND). In some embodiments, the negative system voltage AVEE is a negative voltage level lower than 0V (e.g., the negative system voltage AVEE can be −5V, −7V or −10V). In other words, the negative system voltage AVEE is lower than the ground level GND.

As shown in FIG. 6, the capacitor C1 is coupled between the controller 220 and the first node N1. One end of the capacitor C1 receives the first modulation signal VMOD_GATE1 from the controller 220. The capacitor C2 is coupled between the controller 220 and the second node N2. One end of the capacitor C2 receives the second modulation signal VMOD_GATE2 from the controller 220.

As shown in FIG. 6, a cathode of the diode D1 is coupled to the power integrated circuit 210. During the display period P_disp, the low gate voltage VGL generated by the power integrated circuit 210 is transmitted to a cathode of the diode D1. An anode of the diode D1 is coupled to the first node N1. Because of behaviors of the diode D1, when a voltage level on the anode of the diode D1 is larger than the low gate voltage VGL plus the diode offset DOFF, i.e., "VGL+DOFF", the diode D1 will conduct to discharge the voltage level on the anode of the diode D1. After discharging through the diode D1, the voltage on the first node N1 will eventually be equal to "VGL+DOFF". Therefore, the low gate output signal VGLO will be set to "VGL+DOFF", which is considered as a logic low level, because the diode offset DOFF is usually far smaller than a gap between VGH and VGL. In some cases, the diode offset DOFF can be ignored because the diode offset DOFF is relatively smaller than the gap between VGH and VGL.

As shown in FIG. 6, an anode of the diode D2 is coupled to the power integrated circuit 210. During the display period P_disp, the high gate voltage VGH (at a fixed high level) generated by the power integrated circuit 210 is transmitted to an anode of the diode D2. A cathode of the diode D2 is coupled to the second node N2. Because the high gate voltage VGH will be higher than a diode offset DOFF of the diode D2, the diode D2 will conducts to charge a voltage level on the cathode of the diode D2. Therefore, the low gate output signal VGHO will be set to "VGH−DOFF".

In other words, during the display period P_disp, the low gate output signal VGLO will be fixed at "VGL+DOFF", and the high gate output signal VGHO will be fixed at "VGH−DOFF".

As shown in FIG. 6 and FIG. 7, during a touch period P_touch, the mode selection signal TSHD is configured at a high level, to set the multiplexers MUX1 and MUX2, such that the multiplexer MUX1 selects a swing signal S_LFD2 as a first modulation signal VMOD_GATE1 (toggling between 0V and a negative function voltage level −VLFD), and the multiplexer MUX2 selects the swing signal S_LFD2 as a second modulation signal VMOD_GATE2 (toggling between 0V and the negative function voltage level −VLFD). In some embodiments, the negative function voltage level −VLFD is a negative voltage level, such as −0.1V, −0.2V, −0.3V . . . or −0.5V. In some embodiments, an absolute value of the negative function voltage level, i.e., |−VLFD|, is configured to be smaller than the diode offset, so as to avoid a false trigger on the diodes D1 and D2.

When the driving circuit 200b is switched from the display period P_disp into the touch period P_touch (i.e., a time point T1 at a boundary between the display period P_disp and the touch period P_touch), the first modulation signal VMOD_GATE1 remains at the low voltage level, e.g., 0V (because the swing signal S_LFD2 is currently at 0V). The low gate output signal VGLO remains at "VGL+DOFF" at the time point T1.

Afterward, at a time point T2 after the time point T1, the swing signal S_LFD2 swings from the low voltage level (e.g., 0V) to the negative function voltage level −VLFD, a voltage variance on the first modulation signal VMOD_GATE1 is "−VLFD". Due to the coupling effect of the capacitor C1, the low gate output signal VGLO is pulled low to "VGL+DOFF−VLFD" at the time point T2.

Afterward, during the touch period P_touch, the low gate output signal VGLO swings between "VGL+DOFF" and "VGL+DOFF−VLFD" along with the swing signal S_LFD2. In this case, the driving circuit 200a can provide the proper low gate output signal VGLO to achieve the load-free drive (LFD) function. It is noticed that, during the touch period P_touch, the voltage on the anode of the diode D1 is lower than the voltage on the cathode of the diode D1, such that the low gate output signal VGLO is blocked by the diode D1 and will not be transmitted back to the power integrated circuit 210.

On the other hand, when it is switched from the display period P_disp into the touch period P_touch (i.e., a time point T1 at a boundary between the display period and the touch period), the second modulation signal VMOD_GATE2 switches from the negative system voltage AVEE to the reference voltage (e.g., a ground voltage GND). In some embodiments, the ground voltage GND can be 0V. In this case, a voltage variance on the second modulation signal VMOD_GATE2 is "−AVEE". Because the negative system voltage AVEE is a negative voltage level, the voltage variance "−AVEE" is a positive value. Due to a coupling effect of the capacitor C2, the high gate output signal VGHO is pulled up to "VGH−DOFF−AVEE" at the time point T1. It is noticed that, because the high gate output signal VGHO is pulled higher than a voltage level of the high gate voltage VGH, the diode D2 is not conducted (the voltage on the anode of the diode D2 is lower than the voltage on the cathode of the diode D2), such that the high gate output signal VGHO is blocked by the diode D2 and will not be transmitted back to the power integrated circuit 210.

Afterward, at a time point T2 after the time point T1, the swing signal S_LFD toggles from 0V to −VLFD, a voltage variance on the second modulation signal VMOD_GATE2 is "−VLFD". Due to the coupling effect of the capacitor C2, the high gate output signal VGHO is pulled down to "VGH−DOFF−AVEE−VLFD" at the time point T2.

Afterward, during the touch period P_touch, the high gate output signal VGHO toggles between "VGH−DOFF−AVEE" and "VGH−DOFF−AVEE−VLFD" along with the swing signal S_LFD2. In this case, the driving circuit 200b can provide the proper high gate output signal VGHO to achieve the load-free drive (LFD) function.

In the embodiments shown in FIG. 6 and FIG. 7, the driving circuit 200b is able to provide the proper high gate output signal VGHO and the proper low gate output signal VGLO to the gate integrated circuit 320, without changing the internal structures of the power integrated circuit 210. In this case, the driving circuit 200b can cooperate with a typical design of the power integrated circuit 210 provided by any manufacturer.

In aforesaid embodiments about the driving circuit 200a and the driving circuit 200b shown in FIG. 4 and FIG. 6, the driving circuit 200a or the driving circuit 200b include diodes D1 and D2 to limit the high gate output signal VGHO and the low gate output signal VGLO from feeding back to the power integrated circuit 210. However, the disclosure is not limited to utilize the diodes D1 and D2.

Figure 8:
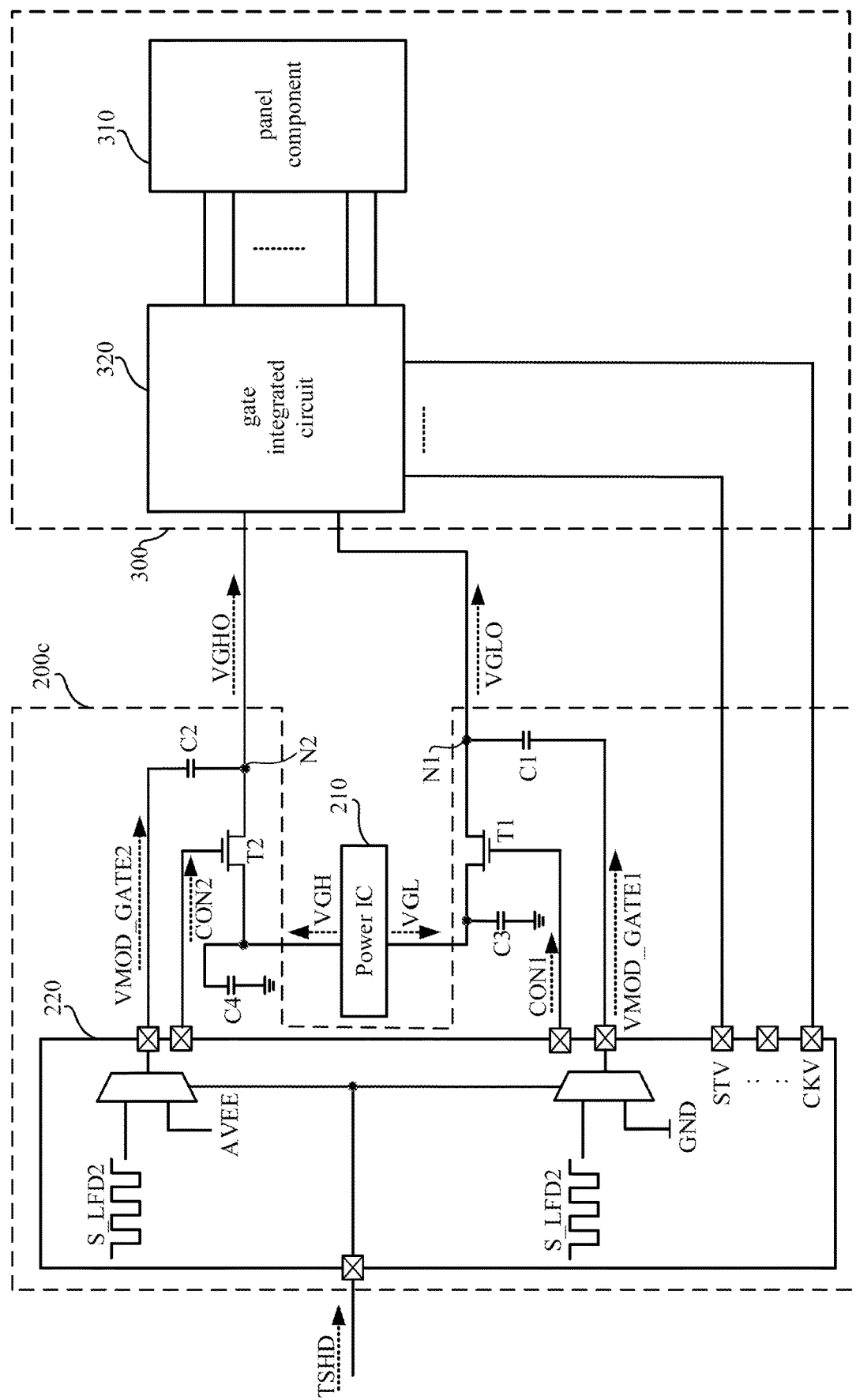
FIG. 8 is a schematic diagram illustrating a driving circuit for driving a touch display panel according to some embodiments of the disclosure.

Reference is further made to FIG. 8, which is a driving circuit 200c for driving a touch display panel 300 according to some embodiments of the disclosure. Behaviors and functions of the driving circuit 200c in FIG. 8 are similar to the driving circuit 200b in FIG. 6. A main difference between the driving circuit 200c and the driving circuit 200b is that, the driving circuit 200c includes two transistors T1 and T2 (to replace the diodes D1 and D2 in the driving circuit 200b shown in FIG. 6).

During the display period P_disp, the transistors T1 and T2 are turned on to be conductive by control signals CON1 and CON2. During the touch period P_touch, the transistor T1 is turned off, based on the control signal CON1, to disconnect two terminals of the transistor T1 for blocking the low gate output signal VGLO from the power integrated circuit 210, and the transistor T2 is turned off, based on the control signal CON2, to disconnect two terminals of the transistor T2 for blocking the high gate output signal VGHO from the power integrated circuit 210. In this case, the driving circuit 200c in FIG. 8 can achieve similar functions of the driving circuit 200b in FIG. 6 discussed in aforesaid embodiments. The driving circuit 200c is able to provide the proper high gate output signal VGHO and the proper low gate output signal VGLO to the gate integrated circuit 320, without changing the internal structures of the power integrated circuit 210. In this case, the driving circuit 200c can cooperate with a typical design of the power integrated circuit 210 provided by any manufacturer.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A driving circuit, for driving a touch display panel, the driving circuit comprising:
    a controller, configured to provide a first modulation signal and a second modulation signal;
    a first diode, a cathode of the first diode being directly coupled to a power integrated circuit, an anode of the first diode being coupled to a first node for providing a low gate output signal to the touch display panel;
    a first capacitor, directly coupled between the controller and the anode of the first diode;
    a second diode, an anode of the second diode being coupled to the power integrated circuit, a cathode of the second diode being coupled to a second node for providing a high gate output signal to the touch display panel; and
    a second capacitor, directly coupled between the controller and the cathode of the second diode.

2. The driving circuit of claim 1, wherein during a display period, the controller is configured to provide the first modulation signal at a first fixed level to the first capacitor, and provide the second modulation signal at a second fixed level to the second capacitor,
    during a touch period, the controller is configured to provide the first modulation signal with toggling voltage levels to the first capacitor, and provide the second modulation signal with toggling voltage levels to the second capacitor.

3. The driving circuit of claim 2, wherein the controller comprises:
    a first multiplexer, configured to provide the first modulation signal to the first capacitor, two inputs of the first multiplexer respectively being configured to receive a high system voltage and a swing signal toggling between two voltage levels; and
    a second multiplexer, configured to provide the second modulation signal to the second capacitor, two inputs of the second multiplexer respectively being configured to receive a reference voltage and the swing signal.

4. The driving circuit of claim 3, wherein during the display period, the first multiplexer is configured to provide the high system voltage as the first modulation signal, and the second multiplexer is configured to provide the reference voltage as the second modulation signal.

5. The driving circuit of claim 4, wherein during the touch period, the first multiplexer is configured to provide the swing signal as the first modulation signal, and the second multiplexer is configured to provide the swing signal as the second modulation signal.

6. The driving circuit of claim 5, wherein at a boundary switching from the display period into the touch period, the first modulation signal is changed from the high system voltage to a low voltage level according to the swing signal, a voltage variance on the first modulation signal is coupled through the first capacitor to pull low the low gate output signal.

7. The driving circuit of claim 3, wherein the swing signal toggles between a low voltage level and a positive function voltage level, and the positive function voltage level is smaller than a diode offset of the first diode or the second diode.

8. The driving circuit of claim 2, wherein the controller comprises:
    a first multiplexer, configured to provide the first modulation signal to the first capacitor, two inputs of the first multiplexer respectively being configured to receive a reference voltage and a swing signal toggling between two voltage levels; and
    a second multiplexer, configured to provide the second modulation signal to the second capacitor, two inputs of the second multiplexer respectively being configured to receive a negative system voltage and the swing signal.

9. The driving circuit of claim 8, wherein during the display period, the first multiplexer is configured to provide the reference voltage as the first modulation signal, and the second multiplexer is configured to provide the negative system voltage as the second modulation signal.

10. The driving circuit of claim 9, wherein during the touch period, the first multiplexer is configured to provide the swing signal as the first modulation signal, and the second multiplexer is configured to provide the swing signal as the second modulation signal.

11. The driving circuit of claim 8, wherein at a boundary switching from the display period into the touch period, the second modulation signal is changed from the negative system voltage to a low voltage level according to the swing signal, a voltage variance on the second modulation signal is coupled through the second capacitor to pull up the high gate output signal.

12. The driving circuit of claim 8, wherein the swing signal toggles between a low voltage level and a negative function voltage level, and an absolute value of the negative function voltage level is smaller than a diode offset of the first diode or the second diode.

13. The driving circuit of claim 2, wherein during the touch period, the first modulation signal with toggling voltage levels is coupled through the first capacitor to cause the low gate output signal toggling, and the second modulation signal with toggling voltage levels is coupled through the second capacitor to cause the high gate output signal toggling.

14. A driving circuit, for driving a touch display panel, the driving circuit comprising:
    a controller, configured to provide a first modulation signal, a second modulation signal, a first control signal and a second control signal;
    a first transistor, directly coupled between a power integrated circuit and a first node, the first node being configured for providing a low gate output signal to the touch display panel, a control terminal of the first transistor being controlled by the first control signal;

a first capacitor, coupled between the controller and the first node;

a second transistor, directly coupled between the power integrated circuit and a second node, the second node being configured for providing a high gate output signal to the touch display panel; and a second capacitor, coupled between the controller and the second node.

15. The driving circuit of claim 14, wherein, during a display period, the controller is configured to provide the first modulation signal at a first fixed level to the first capacitor, provide the second modulation signal at a second fixed level to the second capacitor, and provide the first control signal and the second control signal to turn on the first transistor and the second transistor, during a touch period, the controller is configured to provide the first modulation signal with toggling voltage levels to the first capacitor, provide the second modulation signal with toggling voltage levels to the second capacitor, and provide the first control signal and the second control signal to turn off the first transistor and the second transistor.

16. The driving circuit of claim 15, wherein the controller comprises:

a first multiplexer, configured to provide the first modulation signal to the first capacitor, two inputs of the first multiplexer respectively being configured to receive a reference voltage and a swing signal toggling between two voltage levels; and a second multiplexer, configured to provide the second modulation signal to the second capacitor, two inputs of the second multiplexer respectively being configured to receive a negative system voltage and the swing signal.

17. The driving circuit of claim 16, wherein during the display period, the first multiplexer is configured to provide the reference voltage as the first modulation signal, and the second multiplexer is configured to provide the negative system voltage as the second modulation signal.

18. The driving circuit of claim 17, wherein during the touch period, the first multiplexer is configured to provide the swing signal as the first modulation signal, and the second multiplexer is configured to provide the swing signal as the second modulation signal.

19. The driving circuit of claim 16, wherein at a boundary switching from the display period into the touch period, the second modulation signal is changed from the negative system voltage to a low voltage level according to the swing signal, a voltage variance on the second modulation signal is coupled through the second capacitor to pull up the high gate output signal.

20. The driving circuit of claim 16, wherein the swing signal toggles between a low voltage level and a negative function voltage level.

* * * * *